（12） United States Patent
Jeong et al.

(10) Patent No.: US 12,474,380 B2
(45) Date of Patent: Nov. 18, 2025

(54) BATTERY MANAGEMENT SYSTEM, BATTERY PACK, ENERGY STORAGE SYSTEM AND BATTERY MANAGEMENT METHOD

(71) Applicant: LG ENERGY SOLUTION, LTD., Seoul (KR)

(72) Inventors: Ui-Yong Jeong, Daejeon (KR); Young-Il Ko, Daejeon (KR); Hyung-Jin Hwang, Daejeon (KR); In-Cheol Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 676 days.

(21) Appl. No.: 17/921,250

(22) PCT Filed: Feb. 16, 2022

(86) PCT No.: PCT/KR2022/002292
§ 371 (c)(1),
(2) Date: Oct. 25, 2022

(87) PCT Pub. No.: WO2022/177291
PCT Pub. Date: Aug. 25, 2022

(65) Prior Publication Data
US 2023/0184815 A1    Jun. 15, 2023

(30) Foreign Application Priority Data
Feb. 16, 2021  (KR) .................. 10-2021-0020649

(51) Int. Cl.
*G01R 31/3842*  (2019.01)
*G01R 19/165*  (2006.01)
(Continued)

(52) U.S. Cl.
CPC ... *G01R 19/16542* (2013.01); *G01R 31/3842* (2019.01); *H01M 10/425* (2013.01);
(Continued)

(58) Field of Classification Search
CPC .......... G01R 19/16542; G01R 19/3842; H02J 7/00306; H02J 7/0048
See application file for complete search history.

(56) References Cited

U.S. PATENT DOCUMENTS

2007/0139013 A1    6/2007  Seo et al.
2012/0065824 A1*   3/2012  Takahashi .......... G01R 31/3828
                                                        903/903
(Continued)

FOREIGN PATENT DOCUMENTS

CN    106501726 A    3/2017
CN    106696712 A    5/2017
(Continued)

OTHER PUBLICATIONS

International Search Report (PCT/ISA/210) issued in PCT/KR2022/002292 mailed on May 27, 2022.
(Continued)

*Primary Examiner* — Robert Grant
(74) *Attorney, Agent, or Firm* — Birch, Stewart, Kolasch & Birch, LLP

(57) ABSTRACT

Discussed is a battery management system that may include a battery monitoring device to detect a voltage of each of a reference battery cell and a plurality of battery cells having a common flat region, and detect a current of the battery pack, and a control circuit to stop a charging of the battery pack, initialize a cumulative current value, and determine a state of charge (SOC) of the cell group to be equal to a sum of an SOC of the reference battery cell and the predetermined value, when the voltage of the reference battery cell
(Continued)

reaches a reference voltage during the discharge of the battery pack.

12 Claims, 7 Drawing Sheets

(51) Int. Cl.
    *H01M 10/42*     (2006.01)
    *H02J 7/00*     (2006.01)
    *G01R 31/392*     (2019.01)

(52) U.S. Cl.
    CPC ........ *H02J 7/00306* (2020.01); *H02J 7/0048* (2020.01); *G01R 31/392* (2019.01); *H01M 2010/4271* (2013.01)

(56) References Cited

U.S. PATENT DOCUMENTS

| | | | |
|---|---|---|---|
| 2014/0149058 | A1 | 5/2014 | Moh |
| 2016/0049821 | A1 | 2/2016 | Aridome |
| 2019/0079138 | A1 | 3/2019 | Sano |
| 2021/0311127 | A1 | 10/2021 | Wada et al. |

FOREIGN PATENT DOCUMENTS

| | | |
|---|---|---|
| CN | 109273787 A | 1/2019 |
| CN | 109463022 A | 3/2019 |
| CN | 110015177 A | 7/2019 |
| JP | 2013-37863 A | 2/2013 |
| JP | 2014-185896 A | 10/2014 |
| JP | 2019-100994 A | 6/2019 |
| JP | 6897479 B2 | 6/2021 |
| KR | 10-0669476 B1 | 1/2007 |
| KR | 10-0993655 B1 | 11/2010 |
| KR | 10-1238478 B1 | 3/2013 |
| KR | 10-1491460 B1 | 2/2015 |
| KR | 10-1934858 B1 | 1/2019 |
| KR | 10-1966062 B1 | 4/2019 |
| KR | 10-2085737 B1 | 3/2020 |
| KR | 10-2020-0093228 A | 8/2020 |
| WO | WO 2020-026509 A1 | 2/2020 |

OTHER PUBLICATIONS

European Search Report for European Application No. 22756489.5, dated Mar. 25, 2024.

\* cited by examiner

BATTERY MANAGEMENT SYSTEM, BATTERY PACK, ENERGY STORAGE SYSTEM AND BATTERY MANAGEMENT METHOD

TECHNICAL FIELD

The present application claims the benefit of Korean Patent Application No. 10-2021-0020649 filed on Feb. 16, 2021 with the Korean Intellectual Property Office, the disclosure of which is incorporated herein by reference in its entirety.

The present disclosure relates to technology to determine the State Of Charge (SOC) of a battery.

BACKGROUND ART

Recently, there has been a rapid increase in the demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

A battery pack for use in high capacity and high voltage applications such as electric vehicles or energy storage systems includes a few tens to a few hundreds of battery cells connected in series. A battery management system is provided to acquire battery parameters (for example, voltage, current, State Of Charge (SOC)) of each battery cell, and perform various functions (for example, balancing, cooling) for ensuring reliability and safety of each battery.

Currently, various types of rechargeable battery cells are widely used, and some of them have plateau characteristics in some (for example, SOC 10~90%) of the total SOC range. The plateau characteristics have very small changes in OCV with changes in SOC, and can be observed from an SOC-OCV curve which is a dataset including SOC-Open Circuit Voltage (OCV) relationship records. A lithium ion phosphate (LFP) battery is a type of lithium ion battery using lithium iron phosphate for a positive electrode material (a cathode material), and it is known that an LFP battery has the plateau characteristics.

When the battery cell has an SOC range with the plateau characteristics, the SOC-OCV curve is effective in the SOC estimation outside of the SOC range of the plateau characteristics. However, in the corresponding SOC range, even a very small error in OCV measurement causes a big difference between the estimated SOC and the actual SOC, so it is difficult to accurately determine the SOC of the battery cell being charged and discharged using the SOC-OCV curve. Accordingly, when the SOC of the battery cell is within a flat region (the SOC range having the plateau characteristics), the SOC of the battery cell may be determined based on the cumulative current amount of the battery cell instead of the SOC-OCV curve.

However, when the SOC of the battery cell is maintained in the flat region for a long time, errors between the real current value and the detected current value of the battery cell are continuously accumulated on the cumulative current amount, causing a gradual reduction in SOC estimation accuracy. One of the solutions to the problem is to intentionally charge or discharge the battery cell to place the SOC of the battery cell outside of the flat region, and determine the SOC from the OCV of the battery cell using the SOC-OCV curve. However, when this method is applied to a cell group including a plurality of battery cells connected in series, there are some disadvantages. The first disadvantage is the supply or consumption of a large amount of power to intentionally charge or discharge the plurality of battery cells connected in series. The second disadvantage is a sharp drop or rise in voltage across the cell group occurring when discharging all the plurality of battery cells connected in series to the common cell group below the lower limit of the flat region or charging them above the lower limit of the flat region.

DISCLOSURE

Technical Problem

The present disclosure is designed to solve the above-described problem, and therefore the present disclosure is directed to providing a battery management system, a battery pack, an energy storage system and a battery management method for determining a State Of Charge (SOC) of a cell group in which a plurality of battery cells provided to have a common flat region is connected in series, without intentionally charging or discharging the cell group to place the SOC of each battery cell outside of the flat region.

These and other objects and advantages of the present disclosure may be understood by the following description and will be apparent from an embodiment of the present disclosure. In addition, it will be readily understood that the objects and advantages of the present disclosure may be realized by the means set forth in the appended claims and a combination thereof.

Technical Solution

A battery management system according to an aspect of the present disclosure is provided for a battery pack including a cell group including a plurality of battery cells connected in series and a reference battery cell connected in series to the cell group. The reference battery cell and each battery cell of the cell group are provided to have a flat region, wherein the flat region is a predetermined State Of Charge (SOC) range in which a change in Open Circuit Voltage (OCV) with SOC is maintained below a predetermined reference value. In an initial condition immediately after the battery pack is fabricated, an SOC of the reference battery cell is lower than an SOC of each battery cell of the cell group by a predetermined value. The battery management system includes a battery monitoring device configured to detect a voltage of the reference battery cell and each of the plurality of battery cells, and detect a current of the battery pack; and a control circuit operably coupled to the battery monitoring device, and configured to determine a cumulative current value of the current of the battery pack. The control circuit is configured to stop a discharging of the battery pack, determine the SOC of the reference battery cell based on a reference voltage and the current of the battery pack, initialize the cumulative current value, and determine the SOC of the cell group to be equal to a sum of the SOC of the reference battery cell and the predetermined value, when the voltage of the reference battery cell reaches the reference voltage which is lower than a lower limit of a predetermined safe voltage range during the discharging of the battery pack.

The control circuit may be configured to determine the SOC of the cell group and the SOC of the reference battery cell based on the cumulative current value when the voltage of the reference battery cell is higher than the reference voltage.

The lower limit of the predetermined safe voltage range may be equal to or smaller than an OCV corresponding to a lower limit of the SOC range of the flat region. An upper limit of the predetermined safe voltage range may be equal to or larger than an OCV corresponding to an upper limit of the SOC range of the flat region.

The control circuit may be configured to determine that each battery cell having a lower voltage than the voltage of the reference battery cell is faulty among the plurality of battery cells included in the cell group.

A battery management system according to an aspect of the present disclosure is provided for a battery pack including a cell group including a plurality of battery cells connected in series and a reference battery cell connected in series to the cell group. The reference battery cell and each battery cell of the cell group are provided to have a flat region, wherein the flat region is a predetermined SOC range in which a change in OCV with SOC is maintained below a predetermined reference value. In an initial condition immediately after the battery pack is fabricated, an SOC of the reference battery cell is higher than an SOC of each battery cell of the cell group by a predetermined value. The battery management system includes a battery monitoring device configured to detect a voltage of the reference battery cell and each of the plurality of battery cells, and detect a current of the battery pack; and a control circuit operably coupled to the battery monitoring device, and configured to determine a cumulative current value of the current of the battery pack. The control circuit may be configured to stop a charging of the battery pack, determine the SOC of the reference battery cell based on a reference voltage and the current of the battery pack, initialize the cumulative current value, and determine an SOC of the cell group to be equal to a difference between the SOC of the reference battery cell and the predetermined value, when the voltage of the reference battery cell reaches the reference voltage which is higher than an upper limit of a predetermined safe voltage range during the charging of the battery pack.

The control circuit may be configured to determine the SOC of the cell group and the SOC of the reference battery cell based on the cumulative current value when the voltage of the reference battery cell is lower than the reference voltage.

A battery pack according to another aspect of the present disclosure includes the battery management system.

An energy storage system according to another aspect of the present disclosure includes the battery pack.

A battery management method according to another aspect of the present disclosure is executable by the battery management system. The battery management method includes determining the cumulative current value of the current of the battery pack. When the voltage of the reference battery cell reaches the reference voltage which is lower than the lower limit of the safe voltage range during the discharge of the battery pack, the battery management method further includes stopping discharging the battery pack, and determining the SOC of the reference battery cell based on the reference voltage and the current of the battery pack; and initializing the cumulative current value, and determining the SOC of the cell group to be equal to the sum of the SOC of the reference battery cell and the predetermined value.

A battery management method according to another aspect of the present disclosure is executable by the battery management system. The battery management method includes determining the cumulative current value of the current of the battery pack. When the voltage of the reference battery cell reaches the reference voltage which is higher than the upper limit of the safe voltage range during the charge of the battery pack, the battery management method further includes stopping charging the battery pack, and determining the SOC of the reference battery cell based on the reference voltage and the current of the battery pack; and initializing the cumulative current value, and determining the SOC of the cell group to be equal to the difference between the SOC of the reference battery cell and the predetermined value.

Advantageous Effects

According to at least one of the embodiments of the present disclosure, when a plurality of battery cells provided to have a common flat region is connected in series within a cell group, it is possible to determine the State Of Charge (SOC) of the cell group accurately, safely and efficiently without intentionally charging or discharging the cell group to place the SOC of each battery cell outside of the flat region.

The effects of the present disclosure are not limited to the above-mentioned effects, and these and other effects will be clearly understood by those skilled in the art from the appended claims.

DESCRIPTION OF DRAWINGS

The accompanying drawings illustrate exemplary embodiments of the present disclosure, and together with the detailed description of the present disclosure as described below, serve to provide a further understanding of the technical aspects of the present disclosure, and thus the present disclosure should not be construed as being limited to the drawings.

BEST MODE

Figure 1:
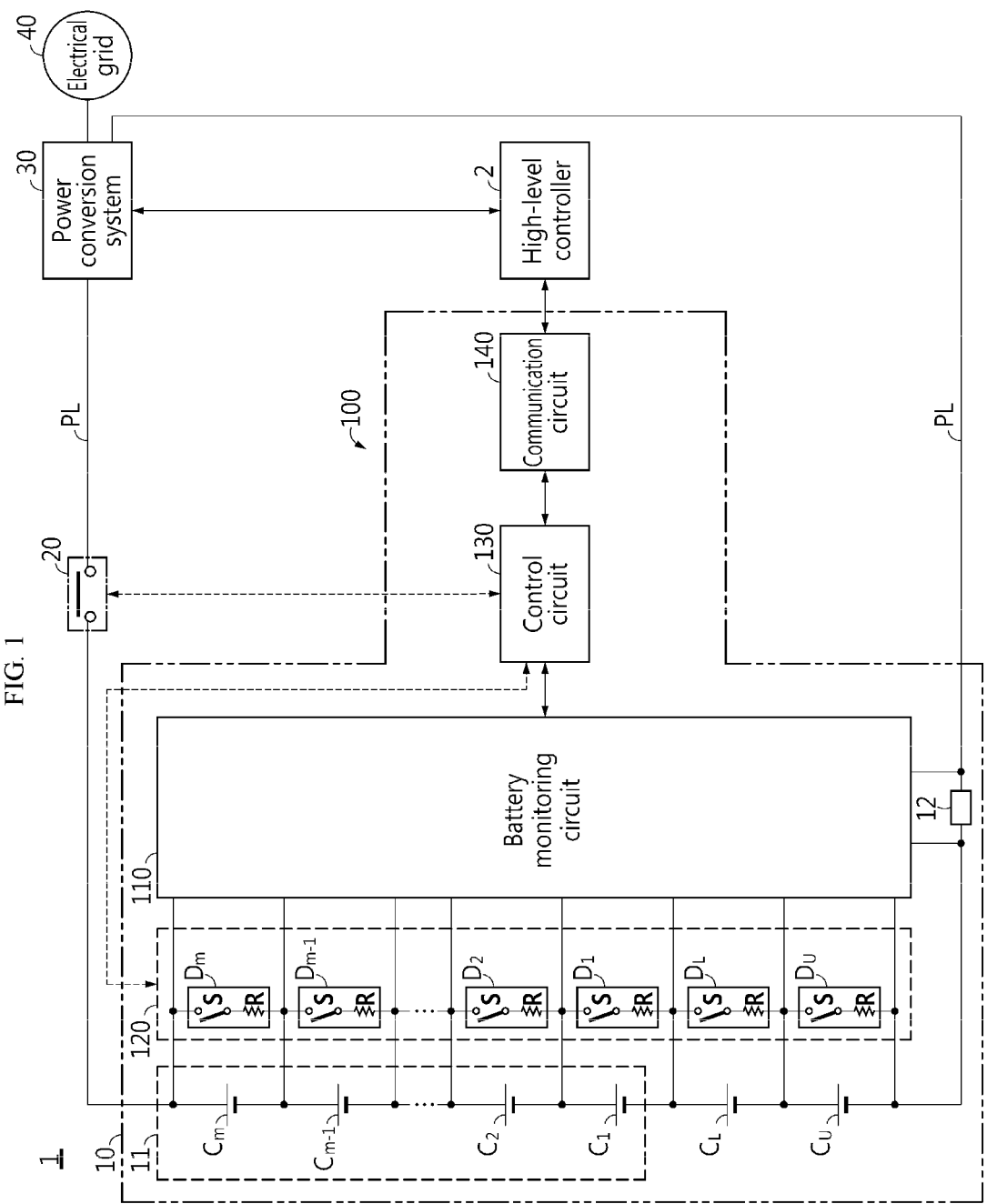
FIG. 1 is a diagram exemplarily showing the architecture of an energy storage system according to the present disclosure.

Hereinafter, exemplary embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a preferred embodiment of the present disclosure, but not intended to fully describe the technical aspects of the present disclosure, so it should be understood that a variety of other equivalents and modifications could have been made thereto at the time that the application was filed.

The terms including the ordinal number such as "first", "second" and the like, are used to distinguish one element from another among various elements, but not intended to limit the elements.

Unless the context clearly indicates otherwise, it will be understood that the term "comprises" when used in this specification, specifies the presence of stated elements, but does not preclude the presence or addition of one or more other elements. Additionally, the term "control unit" as used herein refers to a processing unit of at least one function or operation, and may be implemented in hardware and software either alone or in combination.

In addition, throughout the specification, it will be further understood that when an element is referred to as being "connected to" another element, it can be directly connected to the other element or intervening elements may be present.

In the specification, a State Of Charge (SOC) is a ratio of the remaining capacity of a minimal unit of energy storage (for example, a battery cell, a cell group) to the full charge capacity of the minimal unit of energy storage, and is indicated by 0 to 100%.

Figure 2:
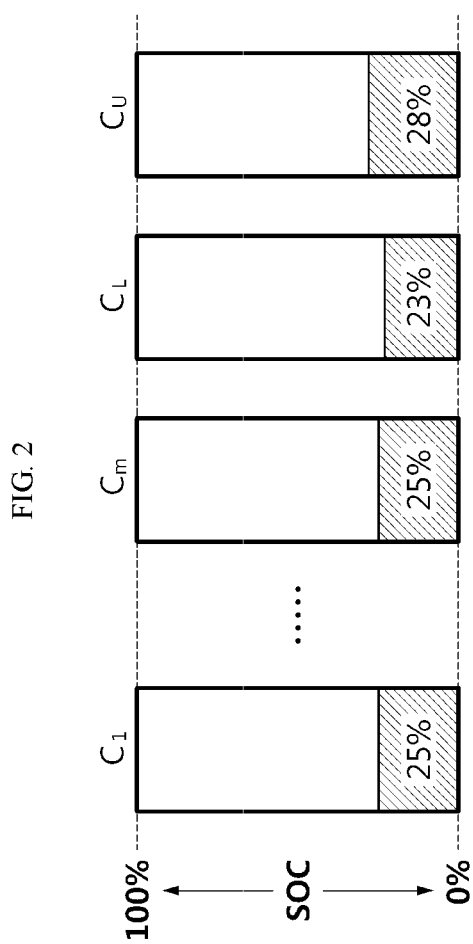
FIG. 2 is a diagram exemplarily showing the adjusted States Of Charge (SOCs) of a plurality of battery cells, a reference battery cell and a reference battery cell immediately after the fabrication of a battery pack.
Figure 3:
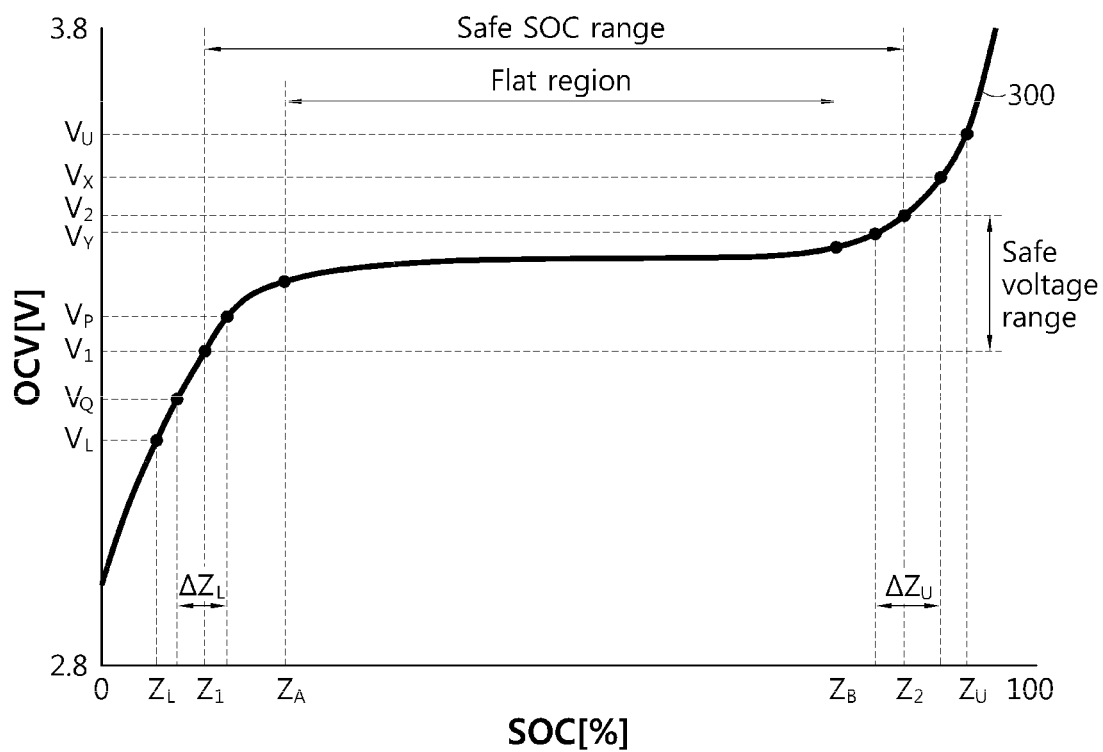
FIG. 3 is a graph exemplarily showing an SOC-Open Circuit Voltage (OCV) curve reflecting plateau characteristics of a battery cell.

FIG. 1 is a diagram exemplarily showing the architecture of an energy storage system according to the present disclosure, FIG. 2 is a diagram exemplarily showing the adjusted SOCs of a plurality of battery cells $C_1 \sim C_m$, a reference battery cell $C_L$ and a reference battery cell $C_L$ immediately after the fabrication of a battery pack 10, and FIG. 3 is a graph exemplarily showing an SOC-Open Circuit Voltage (OCV) curve reflecting the plateau characteristics of the battery cell.

Referring to FIG. 1, the energy storage system 1 includes the battery pack 10, a relay 20 and a power conversion system 30.

The battery pack 10 includes a cell group 11, a current detection device 12 and a battery management system 100. The battery pack 10 further includes at least one of a reference battery cell $C_L$ or a reference battery cell $C_L$. The following description is made under the assumption that the battery pack 10 includes both the reference battery cell $C_L$ and the reference battery cell $C_L$. It should be understood that the reference battery cell $C_L$ or the reference battery cell $C_L$ can be removed from the battery pack 10.

The cell group 11 includes the plurality of battery cells $C_1 \sim C_m$ connected in series where m is a natural number of 2 or greater. The reference battery cell $C_L$ and the reference battery cell $C_L$ are connected in series to the cell group 11. Although FIG. 1 shows that each of the reference battery cell $C_L$ and the reference battery cell $C_L$ is connected in series through the minus terminal of the cell group 11, this is provided for illustrative purposes. For example, the reference battery cell $C_L$ or the reference battery cell $C_L$ may be connected in series to the plus terminal of the cell group 11 or between any two battery cells (for example, $C_1$, $C_2$) of the cell group 11.

In the cell group 11, each of the plurality of battery cells $C_1 \sim C_m$ has positive and negative electrode leads, and the positive electrode lead of one (for example, $C_1$) of two adjacent battery cells (for example, $C_1$, $C_2$) and the negative electrode lead of the other (for example, $C_2$) are joined through welding. Accordingly, a series connection structure from the negative electrode lead of the battery cell $C_1$ to the positive electrode lead of the battery cell $C_m$ is positioned in the cell group 11. Hereinafter, it is noted that the positive electrode lead and the negative electrode lead of the battery cell C may be referred to as a 'positive electrode' and a 'negative electrode', respectively.

The plurality of battery cells $C_1 \sim C_m$, the reference battery cell $C_L$ and the reference battery cell $C_L$ may be fabricated with the same electrical and chemical specification and charge/discharge characteristics. Hereinafter, in the description that is common to the plurality of battery cells $C_1 \sim C_m$, the reference battery cell $C_L$ and the reference battery cell $C_L$, the reference sign 'C' is used to indicate the battery cell. The battery cell C is not limited to a particular type and may include any type of battery cell that can be repeatedly recharged and has plateau characteristics such as a lithium ion phosphate (LFP) battery.

The reference battery cell $C_L$ is provided to reset the SOC of the cell group 11 and prevent overdischarge/undervoltage during the discharge of the battery pack 10. In the initial condition immediately after the fabrication of the battery pack 10, all the plurality of battery cells $C_1 \sim C_m$ of the cell group 11 is adjusted to have the same SOC, and the SOC of the reference battery cell $C_L$ is adjusted to be lower than the plurality of battery cells $C_1 \sim C_m$ of the cell group 11 by a first predefined value $\Delta Z_L$.

The reference battery cell Cu is provided to reset the SOC of the cell group 11 and prevent overcharge/overvoltage during the charge of the battery pack 10. In the initial condition immediately after the fabrication of the battery pack 10, all the plurality of battery cells $C_1 \sim C_m$ of the cell group 11 is adjusted to have the same SOC, and the SOC of the reference battery cell $C_U$ is adjusted to be higher than the plurality of battery cells $C_1 \sim C_m$ of the cell group 11 by a second predefined value $\Delta Z_U$.

Referring to FIG. 2, when the first predefined value $\Delta Z_L$ is 2% and the second predefined value $\Delta Z_U$ is 3%, immediately after the fabrication of the battery pack 10, the SOC of all the plurality of battery cells $C_1 \sim C_m$ is adjusted to 25%, the SOC of the reference battery cell $C_L$ is adjusted to 23%, and the SOC of the reference battery cell $C_U$ is adjusted to 28%. In this case, in the initial condition, the battery management system may determine that the SOC of the cell group 11 is equal to the SOC 25% of the plurality of battery cells $C_1 \sim C_m$.

A series circuit of the cell group 11, the reference battery cell $C_L$) and the reference battery cell Cu may be electrically connected to the power conversion system 30 through the relay 20.

The relay 20 is installed on a power line PL provided as a current path for the charge/discharge of the battery pack 10. While the relay 20 is on, power transfer from any one of the battery pack 10 and the power conversion system 30 to the other is possible. The relay 20 may be implemented as at least one of known switching devices such as a mechanical contactor and a Field Effect Transistor (FET). The control circuit 130 may control the relay 20 from one of an ON state and an OFF state to the other.

The power conversion system 30 is operably coupled to the battery management system 100 through a high-level controller 2. The power conversion system 30 may generate direct current (DC) power for the charge of the battery pack 10 from alternating current (AC) power supplied by an electrical grid 40. The power conversion system 30 may generate AC power from DC power from the battery pack 10.

The battery management system 100 is provided to monitor the condition of each of the plurality of battery cells $C_1$~$C_m$, the reference battery cell $C_L$ and the reference battery cell $C_U$.

The battery management system 100 includes a battery monitoring circuit 110 and a control circuit 130. The battery management system 100 may further include at least one of a cell balancer 120 or a communication circuit 140.

The battery monitoring circuit 110 is provided to electrically connect to the positive and negative electrodes of each of the plurality of battery cells $C_1$~$C_m$, the reference battery cell $C_L$ and the reference battery cell $C_U$ through a voltage sensing channel including a plurality of sensing lines.

The battery monitoring circuit 110 detects a voltage across the battery cell C using a potential difference between a pair of sensing lines connected respectively to the positive and negative electrodes of the battery cell C. The battery monitoring circuit 110 may transmit a voltage signal indicating the detected voltage of the battery cell C to the control circuit 130 through analog-digital conversion.

The battery monitoring circuit 110 is operably coupled to the current detection device 12 through a pair of additional sensing lines. The current detection device 12 is installed on the power line PL, and may include, for example, a shunt resistor and a hall effect device. When the shunt resistor is used as the current detection device 12, the battery monitoring circuit 110 may detect the current flowing through the battery pack 10 based on a potential difference across the current detection device 12. The battery monitoring circuit 110 may transmit a current signal indicating the magnitude and direction of the detected current to the control circuit 130 through analog-digital conversion.

The control circuit 130 is operably coupled to the relay 20, the battery monitoring circuit 110, the cell balancer 120 and/or the communication circuit 140. Operably coupled refers to connected directly/indirectly to transmit and receive a signal in one or two directions.

The control circuit 130 may be implemented in hardware using at least one of digital signal processors (DSPs), digital signal processing devices (DSPDs), programmable logic devices (PLDs), field programmable gate arrays (FPGAs), microprocessors or electrical units for performing the other functions.

The control circuit 130 may have an embedded memory. The memory may store programs and data necessary to perform the battery management methods according to the embodiments as described below. The memory may include, for example, at least one type of storage medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM) or programmable read-only memory (PROM).

The control circuit 130 may collect the voltage signal and the current signal from the battery monitoring circuit 110 at a set time interval (for example, 1 sec), and record them in the memory. Since the current signal includes the direction information of the current, the control circuit 130 may determine whether the battery pack 10 is being charged or discharged or the battery pack 10 is at rest based on the current signal. The rest (or rest state) refers to a state in which the charge and discharge of the battery pack 10 is stopped.

The control circuit 130 may determine a cumulative current amount based on the current signal using ampere counting. The cumulative current amount at an arbitrary time is the total amount of currents accumulated over a period of time from the time at which the cumulative current amount was initialized for the last time before the corresponding time to the corresponding time.

The communication circuit 140 may be coupled to the high-level controller 2 of the energy storage system 1 to enable communication between them. The communication circuit 140 may transmit a message from the high-level controller 2 to the control circuit 130 and a message from the control circuit 130 to the high-level controller 2. The message from the control circuit 130 may include information for notifying the condition (for example, voltage, SOC, overdischarge, undervoltage, overcharge, overvoltage) of the battery cell C. For the communication between the communication circuit 140 and the high-level controller 2, for example, a wired network such as local area network (LAN), controller area network (CAN) and daisy chain and/or a near field wireless network such as Bluetooth, Zigbee and WiFi may be used. The communication circuit 140 may include an output device (for example, a display, a speaker) to provide the information received from the control circuit 130 and/or the high-level controller 2 into a recognizable format. The high-level controller 2 may control the power conversion system 30 based on the information collected via the communication with the battery management system 100.

Referring to FIG. 3, the memory of the control circuit 130 pre-records data indicating a flat region $Z_A$~$Z_B$, a safe voltage range $V_1$~$V_2$, a reference voltage $V_L$ for overdischarge/undervoltage prevention and a reference voltage $V_U$ for overcharge/overvoltage prevention and an SOC-OCV curve 300.

The OCV of the battery cell C is almost uniformly maintained over the flat region $Z_A$~$Z_B$. That is, in the flat region $Z_A$~$Z_B$, a change in OCV with SOC (for example, a derivative) is maintained below a predetermined reference value. In contrast, in the remaining range (0~$Z_A$%, $Z_B$~100%) outside of the flat region $Z_A$~$Z_B$, the change in OCV with SOC is larger than the predetermined reference value, and accordingly it is possible to determine the SOC corresponding to the OCV in a predetermined error range.

It is known that most of rechargeable batteries including the battery cell C degrade faster when they are continuously used near SOC 0% or SOC 100% outside of the optimal range. The safe voltage range $V_1$~$V_2$ is preset considering a relationship between the SOC and the degradation rate of the battery cell C. The SOC($Z_1$) corresponding to the lower limit $V_1$ of the safe voltage range $V_1$~$V_2$ is equal to or lower than the OCV corresponding to the lower limit $Z_A$ of the flat region. The SOC($Z_2$) corresponding to the upper limit $V_2$ of the safe voltage range $V_1$~$V_2$ is equal to or higher than the upper limit $Z_B$ of the flat region. The range between $Z_1$ and $Z_2$ corresponding to the safe voltage range $V_1$~$V_2$ may be referred to as a safe SOC range, and the safe SOC range $Z_1$~$Z_2$ may be equal to or wider than the flat region $Z_A$~$Z_B$.

The reference voltage $V_L$ is equal to or lower than the lower limit $V_1$ of the safe voltage range $V_1$~$V_2$. The control circuit 130 may determine the $SOC(Z_L)$ corresponding to the reference voltage $V_L$ from the SOC-OCV curve 300.

The reference voltage $V_U$ is equal to or higher than the upper limit $V_2$ of the safe voltage range $V_1$~$V_2$. The control circuit 130 may determine the $SOC(Z_U)$ corresponding to the reference voltage $V_U$ from the SOC-OCV curve 300.

The first predefined value $\Delta Z_L$ may be equal to a difference between $SOC(Z_L)$ and the $SOC(Z_1)$. The second predefined value $\Delta Z_U$ may be equal to a difference between the $SOC(Z_U)$ and the $SOC(Z_2)$. The cell balancer 120 is provided to selectively discharge each of the plurality of battery cells $C_1$~$C_m$, the reference battery cell $C_L$ and the reference battery cell $C_U$ in response to a command from the control circuit 130. The cell balancer 120 includes a plurality of discharge circuits $D_1$~$D_m$ provided to the plurality of battery cells $C_1$~$C_m$ in a one-to-one relationship. The cell balancer 120 may further include a discharge circuit $D_U$ provided to the reference battery cell $C_U$ and a discharge circuit $D_L$ provided to the reference battery cell $C_L$. When the reference battery cell $C_L$ or the reference battery cell $C_U$ is omitted from the battery pack, the discharge circuit $D_L$ or the discharge circuit $D_U$ provided to the reference battery cell $C_L$ or the reference battery cell $C_U$ may be omitted.

The battery monitoring circuit 110 and the cell balancer 120 may be integrated into a single integrated circuit. For example, the battery monitoring circuit 110 and the cell balancer 120 may be implemented using application specific integrated circuits (ASICs) such as BQ76940, capable of voltage monitoring, current monitoring and cell balancing.

Each of the plurality of discharge circuits $D_1$~$D_m$, $D_L$, $D_U$ is a series circuit of a discharge resistor R and a switch SW, and is connected in parallel to its corresponding battery cell C. The switch SW of each of the plurality of discharge circuits $D_1$~$D_m$, $D_L$, $D_U$ is switched from the off state to the on state in response to the command from the control circuit 130. While the switch SW of the discharge circuit (for example, $D_1$) is in the on state, the SOC and voltage of the battery cell (for example, $C_1$) gradually reduces by the consumption of energy stored in the corresponding battery cell (for example, $C_1$) by the discharge resistor R of the discharge circuit (for example, $D_1$).

The control circuit 130 may determine that each battery cell C having voltage that is equal to or lower than the voltage of the reference battery cell $C_L$ is faulty among the plurality of battery cells $C_1$~$C_m$ during the charge, discharge or rest of the battery pack 10.

The control circuit 130 may determine that each battery cell C having voltage that is equal to or higher than the voltage of the reference battery cell $C_U$ is faulty among the plurality of battery cells $C_1$~$C_m$ during the charge, discharge or rest of the battery pack 10.

Figure 4:
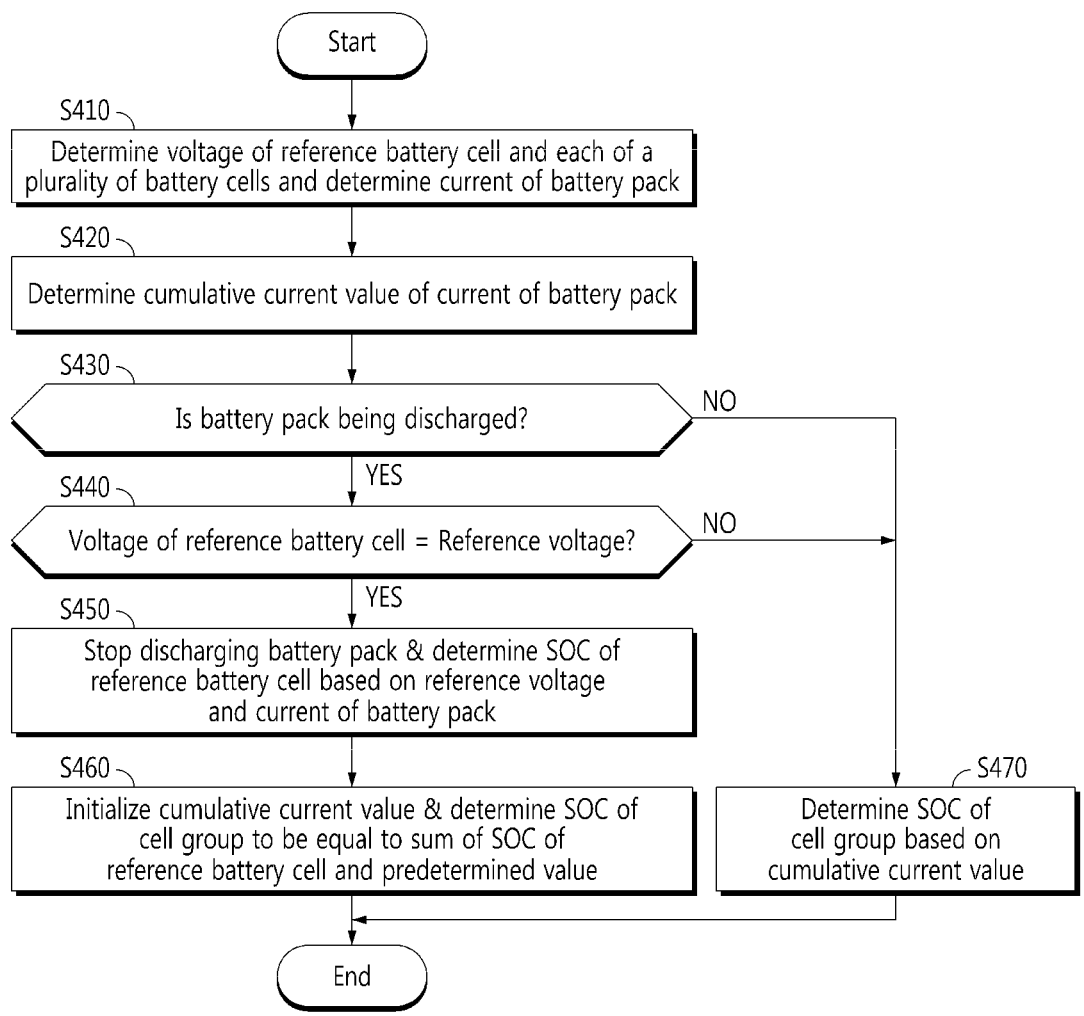
FIG. 4 is a flowchart exemplarily showing a battery management method according to a first embodiment of the present disclosure.

FIG. 4 is a flowchart exemplarily showing a battery management method according to a first embodiment of the present disclosure. The method of FIG. 4 may be performed by the battery management system periodically in a repeated manner at the set time interval when the time during which the battery pack 10 is being charged/discharged or the battery pack 10 is at rest is less than a predetermined storage time after the fabrication time of the battery pack 10 including the reference battery cell $C_L$.

Referring to FIGS. 1 to 4, in step S410, the control circuit 130 determines the voltage of the reference battery cell $C_L$ and each of the plurality of battery cells $C_1$~$C_m$ and determines the current of the battery pack 10 based on the voltage signal and the current signal collected from the battery monitoring circuit.

In step S420, the control circuit 130 determines the cumulative current value of the current of the battery pack 10. The control circuit 130 may determine the cumulative current value of the present cycle by adding a value obtained by multiplying the current of the battery pack 10 determined in the present cycle by the set time to the cumulative current value of the previous cycle. For example, when the cumulative current value of the previous cycle=10 Ah, the current of the battery pack 10 of the present cycle=−1 A and the set time=1 sec=1/3600 hours, the cumulative current value of the present cycle is determined to be (10−1/3600) Ah.

In step S430, the control circuit 130 determines if the battery pack is being discharged. When a value of the step S430 is "YES", step S440 is performed. When the value of the step S430 is "NO", step S470 is performed.

In the step S440, the control circuit 130 determines if the voltage of the reference battery cell $C_L$ reached the reference voltage $V_L$ that is lower than the lower limit $V_1$ of the safe voltage range. For reference, when all the plurality of battery cells $C_1$~$C_m$ is normal, the voltage of the reference battery cell $C_L$ is lower than the voltage of the plurality of battery cells $C_1$~$C_m$, and thus the voltage of the plurality of battery cells $C_1$~$C_m$ is higher than the reference voltage $V_L$. When a value of the step S440 is "YES", step S450 is performed. When the value of the step S440 is "NO", step S470 is performed.

In the step S450, the control circuit 130 stops discharging the battery pack 10 (for example, turns off the relay 20) and determines the SOC of the reference battery cell $C_L$ based on the reference voltage $V_L$ and the current of the battery pack 10. The control circuit 130 may determine the OCV of the reference battery cell $C_L$ by adding a voltage drop corresponding to the multiplication of the current of the battery pack 10 and the internal resistance of the reference battery cell $C_L$ to the reference voltage $V_L$, and determine the SOC of the reference battery cell $C_L$ from the SOC-OCV curve 300 based on the OCV of the reference battery cell $C_L$. For example, when the internal resistance of the reference battery cell $C_L$ is 0.001Ω, the reference voltage $V_L$ is 3.0V, and the current of the battery pack 10 is 10 A, the voltage drop may be determined to be 0.01 V, and the OCV of the reference battery cell $C_L$ may be determined to be 3.01 V. The value of the internal resistance of the reference battery cell $C_L$ may be a preset value recorded in the memory of the control circuit 130. Alternatively, the control circuit 130 may determine the internal resistance of the reference battery cell $C_L$ based on a ratio between a change in the voltage of the reference battery cell $C_L$ and a change in the current of the battery pack 10 at the set time interval according to the Ohm's law.

In step S460, the control circuit 130 initializes the cumulative current value (for example, the cumulative current value=0 Ah), and determines the SOC of the cell group 11 to be equal to the sum of the SOC of the reference battery cell and the first predefined value $\Delta Z_L$.

The steps S450 and S460 are the "SOC resetting" procedure of the cell group 11 being discharged. That is, the step S460 removes a majority of current errors included in the cumulative current value from the latest reset time at which the SOC of the cell group 11 was reset for the last time to the present cycle.

In the step S470, the control circuit 130 determines the SOC of the cell group 11 based on the cumulative current value. For example, the control circuit 130 may determine the SOC of the present cycle of the cell group 11 by adding a change in SOC corresponding to the cumulative current value from the latest reset time at which the SOC of the cell group 11 was reset for the last time to the present cycle to the SOC of the cell group 11 at the latest reset point.

Figure 5:
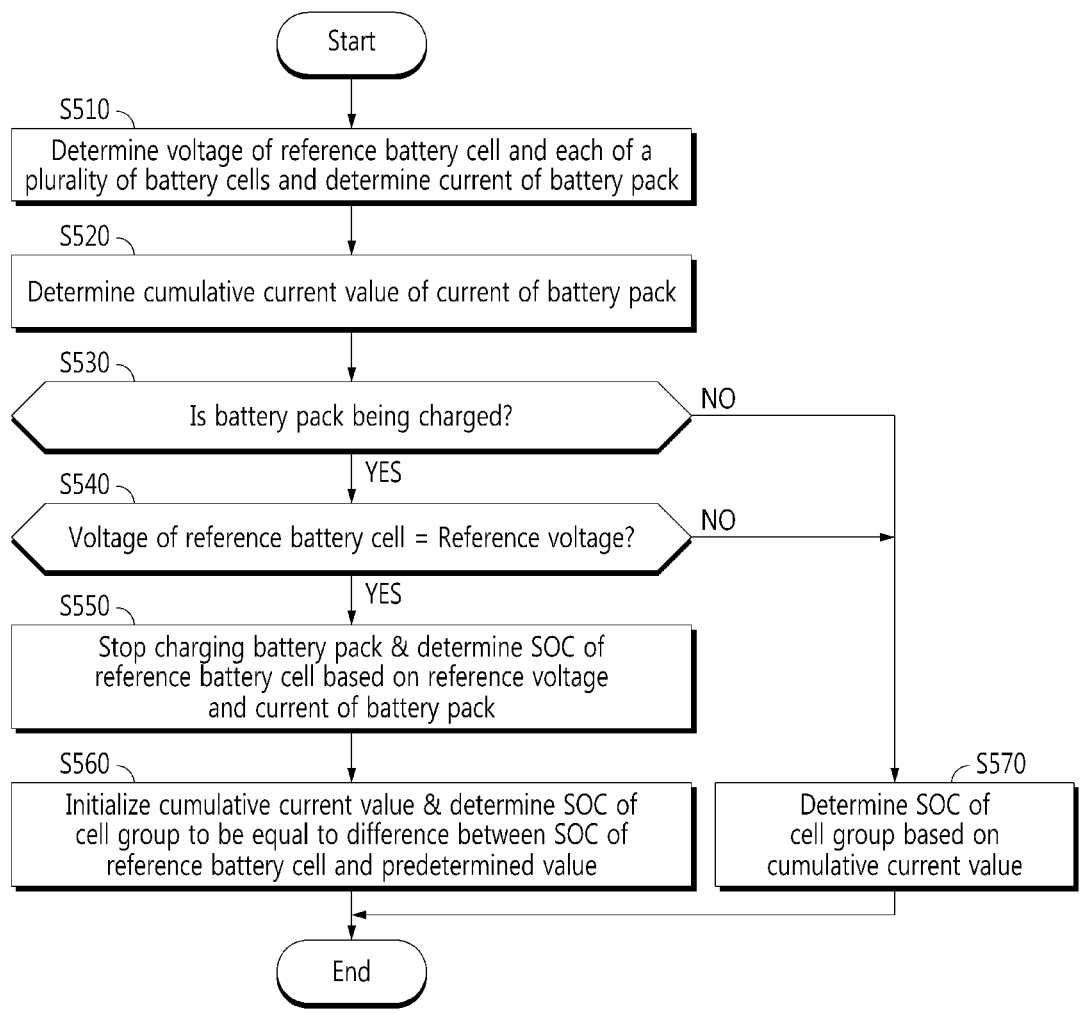
FIG. 5 is a flowchart exemplarily showing a battery management method according to a second embodiment of the present disclosure.

FIG. 5 is a flowchart exemplarily showing a battery management method according to a second embodiment of the present disclosure. The method of FIG. 5 may be performed by the battery management system periodically in a repeated manner at the set time interval when the time during which the battery pack 10 is being charged/discharged or the battery pack 10 is kept in rest state is less than the predetermined storage time after the fabrication time of the battery pack 10 including the reference battery cell $C_U$.

Referring to FIGS. 1 to 5, in step S510, the control circuit 130 determines the voltage of the reference battery cell $C_U$ and each of the plurality of battery cells $C_1 \sim C_m$ and determines the current of the battery pack 10 based on the voltage signal and the current signal collected from the battery monitoring circuit. In step S520, the control circuit 130 determines the cumulative current value of the current of the battery pack 10. The control circuit 130 may determine the cumulative current value of the present cycle by adding a value obtained by multiplying the current of the battery pack 10 determined in the present cycle by the set time to the cumulative current value of the previous cycle. For example, when the cumulative current value of the previous cycle=20 Ah, the current of the battery pack 10 of the present cycle=10 A, the set time=1 sec=1/3600 hours, the cumulative current value of the present cycle is determined as (20+10/3600) Ah.

In step S530, the control circuit 130 determines if the battery pack is being charged. When a value of the step S530 is "YES", step S540 is performed. When the value of the step S530 is "NO", step S570 is performed.

In the step S540, the control circuit 130 determines if the voltage of the reference battery cell $C_U$ reached the reference voltage $V_U$ that is higher than the upper limit $V_2$ of the safe voltage range. For reference, when all the plurality of battery cells $C_1 \sim C_m$ is normal, the voltage of the reference battery cell $C_U$ is higher than the voltage of the plurality of battery cells $C_1 \sim C_m$, and thus the voltage of the plurality of battery cells $C_1 \sim C_m$ is lower than the reference voltage $V_U$. When a value of the step S540 is "YES", step S550 is performed. When the value of the step S540 is "NO", step S570 is performed.

In the step S550, the control circuit 130 stops charging the battery pack 10 (for example, turns off the relay 20) and determines the SOC of the reference battery cell $C_U$ based on the reference voltage $V_U$ and the current of the battery pack 10. The control circuit 130 may determine the OCV of the reference battery cell $C_U$ by subtracting a voltage rise corresponding to the multiplication of the current of the battery pack 10 and the internal resistance of the reference battery cell $C_U$ from the reference voltage $V_U$, and determine the SOC of the reference battery cell $C_U$ from the SOC-OCV curve 300 based on the OCV of the reference battery cell $C_U$. For example, when the internal resistance of the reference battery cell $C_U$ is 0.001Ω, the reference voltage $V_U$ is 3.6V, and the current of the battery pack 10 is 10 A, the voltage rise may be determined to be 0.01 V, and the OCV of the reference battery cell $C_U$ may be determined to be 3.59 V. The value of the internal resistance of the reference battery cell $C_U$ may be a preset value recorded in the memory of the control circuit 130. Alternatively, the control circuit 130 may determine the internal resistance of the reference battery cell $C_U$ based on a ratio between a change in the voltage of the reference battery cell $C_U$ and a change in the current of the battery pack 10 at the set time interval according to the Ohm's law.

In step S560, the control circuit 130 initializes the cumulative current value (for example, the cumulative current value=0 Ah), and determines the SOC of the cell group 11 to be equal to a difference between the SOC of the reference battery cell $C_U$ and the second predefined value $\Delta Z_U$.

The steps S550 and S560 are the "SOC resetting" procedure of the cell group 11 being charged. That is, the step S560 removes a majority of current errors included in the cumulative current value from the latest reset time at which the SOC of the cell group 11 was reset for the last time to the present cycle.

In the step S570, the control circuit 130 determines the SOC of the cell group 11 based on the cumulative current value. For example, the control circuit 130 may determine the SOC of the present cycle of the cell group 11 by adding a change in SOC corresponding to the cumulative current value from the latest reset time at which the SOC of the cell group 11 was reset latest to the present cycle to the SOC of the cell group 11 at the latest reset time.

Figure 6:
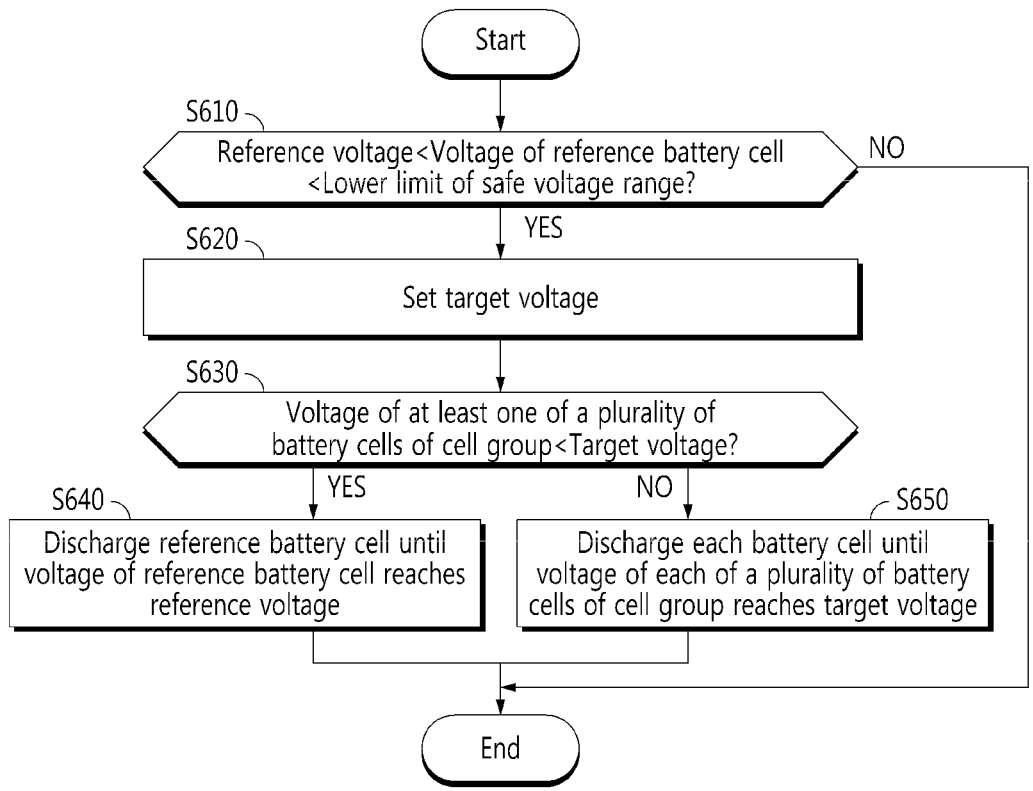
FIG. 6 is a flowchart exemplarily showing a balancing method associated with the battery management method according to the first embodiment of the present disclosure shown in FIG. 4.

FIG. 6 is a flowchart exemplarily showing a balancing method associated with the battery management method according to the first embodiment of FIG. 4. The method of FIG. 6 may be performed by the battery management system 100 when the rest state of the battery pack 10 is maintained for the predetermined storage time or more after the fabrication of the battery pack 10. The storage time is the time required to resolve the polarization voltage of the battery cell C caused by the charge/discharge of the battery pack 10. When the rest state of the battery pack 10 is maintained for the predetermined storage time or more, the voltage detected from the battery cell C may be treated as the OCV.

Referring to FIGS. 1, 3 and 6, in step S610, the control circuit 130 determines if the voltage ($V_P$ in FIG. 3) of the reference battery cell $C_L$ is between the lower limit $V_1$ of the safe voltage range and the reference voltage $V_L$. When the value of the step S610 is "YES", step S620 is performed.

In the step S620, the control circuit 130 sets, as the target voltage, the OCV ($V_P$ in FIG. 3) corresponding to the SOC that is higher than the SOC corresponding to the voltage ($V_Q$ in FIG. 3) of the reference battery cell $C_L$ by the first predefined value $\Delta Z_L$.

In step S630, the control circuit 130 determines if the voltage of at least one of the plurality of battery cells $C_1 \sim C_m$ of the cell group 11 is lower than the target voltage ($V_P$ in FIG. 3). A value of the step S630 being "YES" indicates that an SOC difference between at least one of the plurality of battery cells $C_1 \sim C_m$ and the reference battery cell $C_L$ is smaller than the first predefined value $\Delta Z_L$. When the value of the step S630 is "YES", step 640 is performed. When the value of the step S630 is "NO", step 650 is performed.

In the step S640, the control circuit 130 controls the cell balancer 120 to discharge the reference battery cell $C_L$ until the voltage of the reference battery cell $C_L$ reaches the reference voltage $V_L$. That is, the cell balancer 120 turns on the switch SW of the discharge circuit DL connected in parallel to the reference battery cell $C_L$ in response to the command of the control circuit 130.

In the step S650, the control circuit 130 controls the cell balancer 120 to discharge the plurality of battery cells $C_1 \sim C_m$ until the voltage of each of the plurality of battery cells $C_1 \sim C_m$ of the cell group 11 reaches the target voltage ($V_P$ in FIG. 3). By the step S650, the SOC difference between each of the plurality of battery cells $C_1 \sim C_m$ and the reference battery cell $C_L$ may be adjusted to be equal to the first predefined value $\Delta Z_L$.

Figure 7:
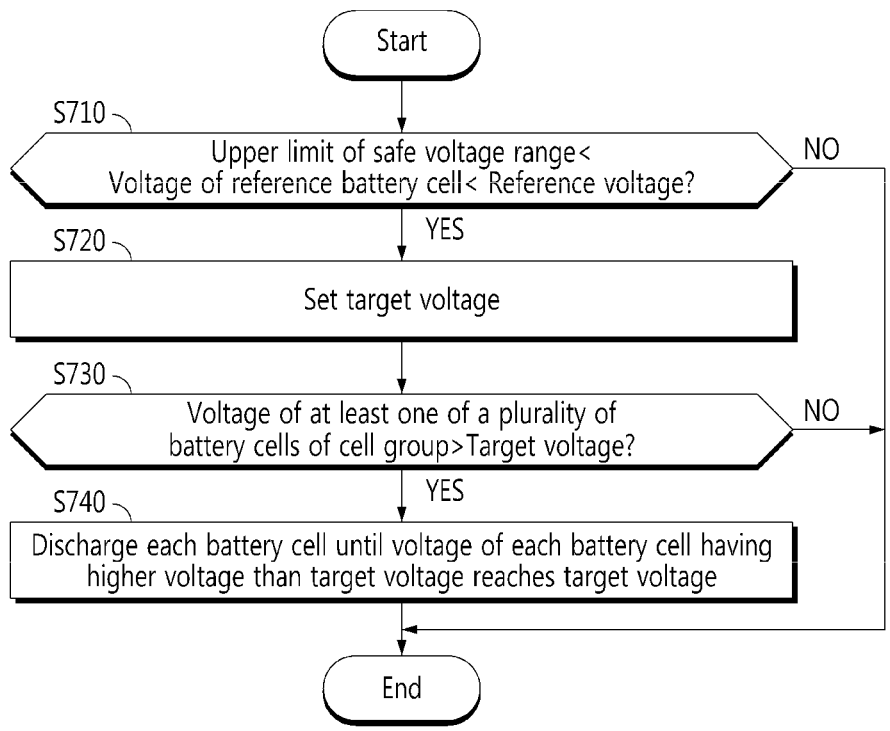
FIG. 7 is a flowchart exemplarily showing a balancing method associated with the battery management method according to the second embodiment of the present disclosure shown in FIG. 5.

FIG. 7 is a flowchart exemplarily showing a balancing method associated with the battery management method according to the second embodiment of FIG. 5. The method of FIG. 7 may be performed by the battery management system 100 when the rest state of the battery pack 10 is maintained for the predetermined storage time or more after the fabrication time of the battery pack 10.

Referring to FIGS. 1, 3 and 7, in step S710, the control circuit 130 determines if the voltage ($V_X$ in FIG. 3) of the reference battery cell $C_U$ is between the upper limit $V_2$ of the safe voltage range and the reference voltage $V_U$. When a value of the step S710 is "YES", step S720 is performed.

In the step S720, the control circuit 130 sets, as the target voltage, the OCV ($V_Y$ in FIG. 3) corresponding to the SOC that is lower than the SOC corresponding to the voltage ($V_X$ in FIG. 3) of the reference battery cell $C_U$ by the second predefined value $\Delta Z_U$.

In step S730, the control circuit 130 determines if the voltage of at least one of the plurality of battery cells $C_1 \sim C_m$ of the cell group 11 is higher than the target voltage ($V_Y$ in FIG. 3). When a value of the step S730 is "YES", step 740 is performed.

In the step S740, the control circuit 130 controls the cell balancer 120 to discharge each battery cell (for example, $C_1$) until the voltage of each battery cell (for example, $C_1$) having a higher voltage than the target voltage among the plurality of battery cells $C_1 \sim C_m$ of the cell group 11 reaches the target voltage ($V_Y$ in FIG. 3). By the step S740, an SOC difference between each of the plurality of battery cells $C_1 \sim C_m$ and the reference battery cell $C_U$ may be adjusted to be equal to the second predefined value $\Delta Z_U$.

The first embodiment and the second embodiment described above are not implemented only in the alternative, and the battery management system 100 may be configured to perform both the battery management function according to the first embodiment and the battery management function according to the second embodiment.

The embodiments of the present disclosure described hereinabove are not implemented only through the apparatus and method, and may be implemented through programs that perform the functions corresponding to the configurations of the embodiments of the present disclosure or recording media having the programs recorded thereon, and such implementation may be easily achieved by those skilled in the art from the disclosure of the embodiments described above.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and all or some of the embodiments may be selectively combined to allow various modifications.

Description of Reference Numerals

1: Energy storage system
10: Battery pack 11: Cell group $C_1 \sim C_m$: Battery cell
$C_L$, $C_U$: Reference battery cell
20: Relay
30: Power conversion system
100: Battery management system
110: Battery monitoring circuit
120: Cell balancer
130: Control circuit
140: Communication circuit

What is claimed is:

1. A battery management system for a battery pack including a cell group including a plurality of battery cells connected in series and a reference battery cell connected in series to the cell group,
wherein the reference battery cell and each battery cell of the cell group are provided to have a flat region,
wherein the flat region is a predetermined State Of Charge (SOC) range in which a change in Open Circuit Voltage (OCV) with SOC is maintained below a predetermined reference value, and
wherein in an initial condition immediately after the battery pack is fabricated, an SOC of the reference battery cell is lower than an SOC of each battery cell of the cell group by a predetermined value,
the battery management system comprising:
a battery monitoring device configured to detect a voltage of the reference battery cell and each of the plurality of battery cells, and detect a current of the battery pack; and
a control circuit operably coupled to the battery monitoring device, and configured to determine a cumulative current value of the current of the battery pack,
wherein the control circuit is configured to stop a discharging of the battery pack, determine the SOC of the reference battery cell based on a reference voltage and the current of the battery pack, initialize the cumulative current value, and determine the SOC of the cell group to be equal to a sum of the SOC of the reference battery cell and the predetermined value, when the voltage of the reference battery cell reaches the reference voltage which is lower than a lower limit of a predetermined safe voltage range during the discharging of the battery pack.

2. The battery management system according to claim 1, wherein the control circuit is configured to determine the SOC of the cell group and the SOC of the reference battery cell based on the cumulative current value when the voltage of the reference battery cell is higher than the reference voltage.

3. The battery management system according to claim 1, wherein the lower limit of the predetermined safe voltage range is equal to or smaller than an OCV corresponding to a lower limit of the SOC range of the flat region, and
wherein an upper limit of the predetermined safe voltage range is equal to or larger than an OCV corresponding to an upper limit of the SOC range of the flat region.

4. The battery management system according to claim 1, wherein the control circuit is configured to determine that each battery cell having a lower voltage than the voltage of the reference battery cell is faulty among the plurality of battery cells included in the cell group.

5. A battery management system for a battery pack including a cell group including a plurality of battery cells connected in series and a reference battery cell connected in series to the cell group,
wherein the reference battery cell and each battery cell of the cell group are provided to have a flat region, wherein the flat region is a predetermined State Of Charge (SOC) range in which a change in Open Circuit Voltage (OCV) with SOC is maintained below a predetermined reference value, and wherein in an initial condition immediately after the battery pack is fabricated, an SOC of the reference battery cell is higher than an SOC of each battery cell of the cell group by a predetermined value, the battery management system comprising:

a battery monitoring device configured to detect a voltage of the reference battery cell and each of the plurality of battery cells, and detect a current of the battery pack; and a control circuit operably coupled to the battery monitoring device, and configured to determine a cumulative current value of the current of the battery pack, wherein the control circuit is configured to stop a charging of the battery pack, determine the SOC of the reference battery cell based on a reference voltage and the current of the battery pack, initialize the cumulative current value, and determine an SOC of the cell group to be equal to a difference between the SOC of the reference battery cell and the predetermined value, when the voltage of the reference battery cell reaches the reference voltage which is higher than an upper limit of a predetermined safe voltage range during the charging of the battery pack.

6. The battery management system according to claim 5, wherein the control circuit is configured to determine the SOC of the cell group and the SOC of the reference battery cell based on the cumulative current value when the voltage of the reference battery cell is lower than the reference voltage.

7. A battery pack comprising the battery management system according to claim 1.

8. An energy storage system comprising the battery pack according to claim 7.

9. A battery management method that is executable by the battery management system according to claim 1, the battery management method comprising:

determining the cumulative current value of the current of the battery pack; and when the voltage of the reference battery cell reaches the reference voltage which is lower than the lower limit of the safe voltage range during the discharge of the battery pack, stopping the discharging of the battery pack, and determining the SOC of the reference battery cell based on the reference voltage and the current of the battery pack, and initializing the cumulative current value, and determining the SOC of the cell group to be equal to the sum of the SOC of the reference battery cell and the predetermined value.

10. A battery management method that is executable by the battery management system according to claim 5, the battery management method comprising:

determining the cumulative current value of the current of the battery pack; and when the voltage of the reference battery cell reaches the reference voltage which is higher than the upper limit of the safe voltage range during the charge of the battery pack, stopping charging the battery pack, and determining the SOC of the reference battery cell based on the reference voltage and the current of the battery pack, and initializing the cumulative current value, and determining the SOC of the cell group to be equal to the difference between the SOC of the reference battery cell and the predetermined value.

11. A battery pack comprising the battery management system according to claim 5.

12. An energy storage system comprising the battery pack according to claim 11.

* * * * *